(12) United States Patent
Shindo

(10) Patent No.: US 7,674,441 B2
(45) Date of Patent: Mar. 9, 2010

(54) HIGHLY PURE HAFNIUM MATERIAL, TARGET AND THIN FILM COMPRISING THE SAME AND METHOD FOR PRODUCING HIGHLY PURE HAFNIUM

(75) Inventor: Yuichiro Shindo, Ibaraki (JP)

(73) Assignee: Nippon Mining & Metals Co., Ltd, Tokyo (JP)

( * ) Notice: Subject to any disclaimer, the term of this patent is extended or adjusted under 35 U.S.C. 154(b) by 0 days.

(21) Appl. No.: 12/353,405

(22) Filed: Jan. 14, 2009

(65) Prior Publication Data

US 2009/0126529 A1 May 21, 2009

Related U.S. Application Data

(62) Division of application No. 10/565,767, filed as application No. PCT/JP2004/005389 on Apr. 15, 2004.

(30) Foreign Application Priority Data

Jul. 25, 2003 (JP) ............... 2003-279695

(51) Int. Cl.
C22B 3/38 (2006.01)
C22B 34/14 (2006.01)
(52) U.S. Cl. .............. 423/73; 423/70; 75/612
(58) Field of Classification Search ........... 75/419–420, 75/611–621; 423/70–80
See application file for complete search history.

(56) References Cited

U.S. PATENT DOCUMENTS

| | | | |
|---|---|---|---|
| 2,782,116 A * | 2/1957 | Spedding et al. .............. 75/395 |
| 4,637,831 A | 1/1987 | Stoltz et al. |
| 4,668,287 A | 5/1987 | Kwon |
| 4,897,116 A | 1/1990 | Scheel |
| 5,112,493 A | 5/1992 | Snyder et al. |
| 5,196,916 A | 3/1993 | Ishigami et al. |
| 5,458,697 A | 10/1995 | Ishigami et al. |
| 5,460,793 A | 10/1995 | Kano et al. |
| 5,679,983 A * | 10/1997 | Ishigami et al. ............. 257/765 |
| 6,352,628 B2 | 3/2002 | Sato et al. |
| 6,723,183 B2 | 4/2004 | Oda et al. |
| 6,737,030 B2 | 5/2004 | Sommers et al. |
| 6,861,030 B2 | 3/2005 | Shindo |
| 6,986,834 B2 | 1/2006 | Irumata et al. |
| 7,241,368 B2 | 7/2007 | Irumata et al. |
| 2002/0194953 A1 | 12/2002 | Rosenberg et al. |
| 2003/0062261 A1 * | 4/2003 | Shindo .................. 204/298.13 |
| 2004/0170552 A1 | 9/2004 | Irumata et al. |
| 2006/0062910 A1* | 3/2006 | Meiere ........................ 427/226 |
| 2006/0189164 A1 | 8/2006 | Okabe et al. |
| 2006/0193979 A1* | 8/2006 | Meiere et al. ............... 427/226 |
| 2006/0266158 A1 | 11/2006 | Shindo |
| 2007/0018138 A1 | 1/2007 | Shindo |
| 2009/0000704 A1 | 1/2009 | Okabe et al. |

FOREIGN PATENT DOCUMENTS

| | | | |
|---|---|---|---|
| EP | 0134643 A2 | 3/1985 |
| EP | 0154448 A2 | 9/1985 |
| JP | 2008-115063 * | 5/2008 |

OTHER PUBLICATIONS

R.H. Nielsen, "Hafnium and Hafnium Compounds", in Ullmann's Encyclopedia of Industrial Chemistry, Wiley-VCH Verlag GmbH & Co, Jun. 15, 2000, p. 1-13.*
R. H. Nielsen, "Hafnium and Hafnium Compounds", in Kirk-Othmer Encyclopedia of Chemical Technology, John Wiley & Sons, Inc., Jun. 18, 2004, p. 1-21.*
English Abstract of JP 10-204554, Aug. 4, 1998.
English Abstract of JP 07-316681, Dec. 5, 1995.
English Abstract of JP 2003-193150, Jul. 9, 2003.
English Abstract of JP 04-099829, Mar. 31, 1992.
English Abstract of JP 2000-345252, Dec. 12, 2000.
English Abstract of JP 61-242993, Oct. 29, 1986.
English Abstract of JP 2002-089444, Mar. 27, 2002.
Co-Pending U.S. Appl. No. 11/994,167 (unpublished).

* cited by examiner

*Primary Examiner*—George Wyszomierski
*Assistant Examiner*—Mark L Shevin
(74) *Attorney, Agent, or Firm*—Howson & Howson LLP

(57) ABSTRACT

A method of manufacturing high purity hafnium is provided and includes the steps of making aqueous solution of chloride of hafnium, thereafter removing zirconium therefrom via solvent extraction, performing neutralization treatment to obtain hafnium oxide, further performing chlorination to obtain hafnium chloride, obtaining hafnium sponge via reducing said hafnium chloride, and performing electron beam melting to the hafnium sponge in order to obtain a hafnium ingot, as well as a high purity hafnium material obtained thereby and a target and thin film formed from such material. The present invention relates to a high purity hafnium material with reduced zirconium content contained in the hafnium, a target and thin film formed from such material, and the manufacturing method thereof, and provides efficient and stable manufacturing technology, a high purity hafnium material obtained according to such manufacturing technology, and a target and high purity hafnium thin film formed from such material.

18 Claims, No Drawings

HIGHLY PURE HAFNIUM MATERIAL, TARGET AND THIN FILM COMPRISING THE SAME AND METHOD FOR PRODUCING HIGHLY PURE HAFNIUM

CROSS REFERENCE TO RELATED APPLICATIONS

This application is a divisional of co-pending U.S. application Ser. No. 10/565,767, which is the National Stage of International Application No. PCT/JP04/05389, filed Apr. 15, 2004, which claims the benefit under 35 USC §119 of Japanese Application No. 2003-279695, filed Jul. 25, 2003.

BACKGROUND OF THE INVENTION

The present invention relates to a high purity hafnium material with a reduced zirconium content contained in the hafnium, a target and thin film formed from this material, and a manufacturing method of high purity hafnium.

Conventionally, there are numerous documents relating to the manufacture of hafnium, and, since hafnium and zirconium are very similar in terms of atomic structure and chemical property, the inclusion of zirconium or the inclusion of zirconium in hafnium was never really acknowledged as a problem as exemplified below.

Hafnium and zirconium are superior in heat resistance and corrosion resistance, and are characterized in that they have a strong affinity with oxygen and nitrogen. And, since the oxides or nitrides thereof have superior stability in high temperatures, they are utilized as ceramics in the atomic power generation or as fire-resistant materials in the manufacture of steel or castings. Further, recently, these are also being used as electronic materials or optical materials.

The manufacturing method of metal hafnium or metal zirconium is proposed as the same manufacturing method. As such example, there is a method of reacting a fluorine-containing zirconium or hafnium compound with metal aluminum or magnesium in inert gas, reducing gas or vacuum at a temperature of 400° C. or higher (e.g., refer to Japanese Patent Laid-Open Publication No. S60-17027); a manufacturing method of reducing zirconium chloride, hafnium chloride or titanium chloride to obtain the respective metals thereof characterized in the sealing metal (e.g., refer to Japanese Patent Laid-Open Publication No. S61-279641); a manufacturing method of hafnium or zirconium characterized in the reaction container structure upon reducing zirconium tetrachloride or hafnium tetrachloride with magnesium and the manufacturing technique thereof (e.g., refer to Japanese Patent Laid-Open Publication No. S62-103328); a method of manufacturing chloric-, bromic- or iodic-zirconium, hafnium, tantalum, vanadium or niobium compound vapor by introducing these into a crucible (e.g., refer to PC(WO)1991-501630); a method of refining zirconium or hafnium chloride or an acid chloride aqueous solution with strongly basic anion exchange resin (e.g., refer to Japanese Patent Laid-Open Publication No. H10-204554); and a method of collecting zirconium via solvent extraction (e.g., refer to Japanese Patent Laid-Open Publication No. S60-255621).

As described in the foregoing documents, although there are numerous refining methods and extraction methods of zirconium and hafnium, the inclusion of zirconium or the inclusion of zirconium in hafnium was never really acknowledged as a problem.

Nevertheless, in recent years, deposition on electronic components using hafnium silicide is being demanded. In such a case, even zirconium is an impurity, and there is a possibility that the required characteristics of the hafnium raw material may become unstable. Therefore, there is demand for a high purity hafnium material with reduced zirconium, and a target and thin film formed from such a material.

However, since there was no notion of separating hafnium from zirconium as described above, the actual condition is that there is no efficient and stable manufacturing technology for obtaining the foregoing high purity hafnium material with reduced zirconium, and a target and thin film formed from such a material.

SUMMARY OF THE INVENTION

Thus, the present invention relates to a high purity hafnium material with a reduced zirconium content contained in the hafnium, a target and thin film formed from this material, and a manufacturing method of high purity hafnium, and an object thereof is to provide efficient and stable manufacturing technology, a high purity hafnium material obtained according to such manufacturing technology, and a target and thin film formed from such material.

In order to achieve the foregoing object, as a result of intense study, the present inventors discovered that high purity hafnium can be manufactured by separating zirconium via solvent extraction, and performing electron beam melting thereto.

Based on the foregoing discovery, the present invention provides a high purity hafnium material, and a target and thin film formed from this material, wherein the zirconium content is 1 to 1000 wtppm, and the purity thereof is 4N to 6N excluding gas components such as carbon, oxygen and nitrogen. The material, target, and thin film have contents of oxygen of 500 wtppm or less, nitrogen and carbon of 100 wtppm or less, respectively, and iron, chromium and nickel of 10 wtppm or less, respectively. The purity of the material, target, and thin film is 4N to 6N, excluding gas components such as carbon, oxygen and nitrogen.

The present invention also provides a method of manufacturing high purity hafnium including the steps of making an aqueous solution of chloride of hafnium, thereafter removing zirconium therefrom via solvent extraction, performing neutralization treatment to obtain hafnium oxide, further performing chlorination to obtain hafnium chloride, and reducing this to obtain a hafnium sponge. The moisture content in the hafnium chloride before reduction and in the atmosphere is preferably 0.1 wt % or less, and the nitrogen content therein is preferably 0.1 wt % or less. The reduction atmosphere is preferably an argon atmosphere, and reduction can be performed under a positive pressure of 1 atmospheric pressure or greater. Electron beam melting can be further performed to the hafnium sponge to obtain a hafnium ingot. Hafnium chloride can be reduced with metal having stronger chloridization power than hafnium. The high purity hafnium preferably has a zirconium content of 1 to 1000 wtppm and a purity of 4N to 6N excluding gas components such as carbon, oxygen and nitrogen. The content of oxygen in the material is 100 wtppm or less; the content of nitrogen and carbon is 30 wtppm or less, respectively; and the content of iron, chromium and nickel is 5 wtppm or less, respectively.

The present invention yields a superior effect in that high purity hafnium can be stably manufactured by removing zirconium from the hafnium chloride aqueous solution via solvent extraction, reducing this to obtain a hafnium sponge, thereafter performing electron beam melting to this hafnium sponge, and thereby efficiently removing zirconium.

Further, the present invention yields an effect in that a high purity hafnium thin film can be obtained by manufacturing a sputtering target from the high purity hafnium ingot obtained with the foregoing process, and using this target to perform sputtering.

DETAILED DESCRIPTION OF THE INVENTION

In the present invention, the starting raw material will be hafnium tetrachloride ($HfCl_4$). A commercially available material can be used as the hafnium tetrachloride. This commercially available hafnium tetrachloride contains roughly 5 wt % of zirconium.

This hafnium raw material, excluding zirconium, has a purity level of 3N, and contains, as main impurities other than zirconium, roughly 500 wtppm, 40 wtppm and 1000 wtppm of iron, chromium and nickel, respectively.

First, this hafnium tetrachloride raw material is dissolved in purified water. Next, this is subject to multistage organic solvent extraction. Normally, solvent extraction is performed in 1 to 10 stages. TBP may be used as the organic solvent. As a result, zirconium can be made to be 1000 wtppm or less, and normally 1 to 200 wtppm.

Next, neutralization treatment is performed to obtain hafnium oxide ($HfO_2$). This hafnium oxide is subject to chlorination to obtain high purity hafnium tetrachloride ($HfCl_4$), and this is further reduced with, for instance, magnesium metal having chloridization power that is stronger than hafnium or zirconium to obtain a hafnium sponge. As the reducing metal, in addition to magnesium, for instance, calcium, sodium, and so on may be used.

In order to efficiently perform the reduction treatment, it is desirable to make the moisture content in the hafnium chloride before reduction and in the atmosphere 0.1 wt % or less, and the nitrogen content therein 0.1 wt % or less. Further, when argon atmosphere is the reduction atmosphere, it is desirable to perform the reduction under a positive pressure of 1 atmospheric pressure or greater.

The obtained hafnium sponge may be further subject to electron beam melting for removing volatile elements, gas components and so on in order to increase the purity thereof.

According to the foregoing process, obtained is a high purity hafnium ingot wherein zirconium is 1 to 1000 wtppm and having a purity of 4N (99.99 wt %) or more excluding gas components such as carbon, oxygen and nitrogen; a high purity hafnium material wherein zirconium is 1 to 1000 wtppm, oxygen is 100 wtppm or less, nitrogen and carbon are respectively 30 wtppm or less, iron, chrome and nickel are respectively 5 wtppm or less, and having a purity of 4N to 6N excluding gas components such as carbon, oxygen and nitrogen; and a target formed from such high purity hafnium material; and, by using this target to perform sputtering, the high purity hafnium material can be deposited on a substrate.

The target may be manufactured with the ordinary processing steps of forging, rolling, cutting, finishing (polishing) and so on. There is no particular limitation in the manufacturing method thereof, and the method may be selected arbitrarily.

According to the present manufacturing method, as described above, the zirconium content in the hafnium can be reduced down to 1 wtppm, and a total purity of 6N can be achieved.

EXAMPLES

The Examples are now explained. Incidentally, these Examples are merely illustrative, and the present invention shall in no way be limited thereby. In other words, the present invention shall only be limited by the scope of claim for a patent, and shall include the various modifications other than the Examples of this invention.

Example 1

The present invention used 100 g of commercially available hafnium tetrachloride ($HfCl_4$) having a purity of 3N and containing roughly 5000 wtppm of zirconium as the raw material, and this was dissolved in 1 L of purified water to obtain a nitric acid solution. This raw material contained 500 wtppm, 40 wtppm and 1000 wtppm of iron, chromium and nickel, respectively, as its main impurities.

Next, this hafnium raw material was subject to 4-stage organic solvent extraction using TBP organic solvent, and neutralization treatment was performed to obtain hafnium oxide ($HfO_2$).

Further, this hafnium oxide was subject to chlorination to obtain high purity hafnium tetrachloride ($HfCl_4$), and then subject to magnesium reduction to obtain a hafnium sponge. In order to efficiently perform the reduction treatment, the moisture content in the hafnium chloride before reduction and in the atmosphere was made to be 0.1 wt % or less, and the nitrogen content therein was made to be 0.1 wt % or less. Moreover, the atmosphere was made to be argon atmosphere, and reduction was performed under a positive pressure of 1.2 atmospheric pressure.

The obtained hafnium sponge was further subject to electron beam melting to remove volatile elements, gas components and so on. As a result of the foregoing process, it was possible to obtain a high purity hafnium ingot having a purity level of 4N5 (99.995 wt %) wherein zirconium is 80 wtppm; iron, chrome and nickel are respectively 1 wtppm, 0.2 wtppm and 2 wtppm; and oxygen, nitrogen and carbon are respectively 20 wtppm, 10 wtppm and 20 wtppm.

The sputtering target obtained from this ingot was able to maintain high purity, and it was possible to form a high purity hafnium thin film having uniform characteristics on a substrate by performing sputtering with such sputtering target.

Example 2

The present invention used 100 g of commercially available hafnium tetrachloride ($HfCl_4$) having a purity of 2N5 and containing roughly 3500 wtppm of zirconium as the raw material, and this was dissolved in 1 L of purified water. This raw material contained 500 wtppm, 100 wtppm and 300 wtppm of iron, chromium and nickel, respectively, as its main impurities.

Next, this hafnium raw material was subject to 6-stage organic solvent extraction using TBP organic solvent, and neutralization treatment was performed to obtain hafnium oxide ($HfO_2$). Further, this hafnium oxide was subject to chlorination to obtain high purity hafnium tetrachloride ($HfCl_4$), and then subject to calcium reduction to obtain hafnium sponge.

In order to efficiently perform the reduction treatment, the moisture content in the hafnium chloride before reduction and in the atmosphere was made to be 0.1 wt % or less, and the nitrogen content therein was made to be 0.05 wt % or less. Moreover, the atmosphere was made to be argon atmosphere, and reduction was performed under a positive pressure of 2 atmospheric pressure.

The obtained hafnium sponge was further subject to electron beam melting to remove volatile elements, gas components and so on. As a result of the foregoing process, it was possible to obtain a high purity hafnium ingot having a purity level of 4N (99.99 wt %) wherein zirconium is 600 wtppm; iron, chrome and nickel are respectively 10 wtppm, 2 wtppm and 5 wtppm; and oxygen, nitrogen and carbon are respectively 100 wtppm, 30 wtppm and 30 wtppm.

The sputtering target obtained from this ingot was able to maintain high purity, and it was possible to form a high purity hafnium thin film having uniform characteristics on a substrate by performing sputtering with such sputtering target.

Example 3

The present invention used 100 g of commercially available hafnium tetrachloride ($HfCl_4$) having a purity of 3N5 and containing roughly 1200 wtppm of zirconium as the raw material, and this was dissolved in 1 L of purified water. This raw material contained 500 wtppm, 100 wtppm and 300 wtppm of iron, chromium and nickel, respectively, as its main impurities.

Next, this hafnium raw material was subject to 20-stage organic solvent extraction using TBP organic solvent, and neutralization treatment was performed to obtain hafnium oxide ($HfO_2$). Further, this hafnium oxide was subject to chlorination to obtain high purity hafnium tetrachloride ($HfCl_4$), and then subject to sodium reduction to obtain hafnium sponge.

In order to efficiently perform the reduction treatment, the moisture content in the hafnium chloride before reduction and in the atmosphere was made to be 0.001 wt %, and the nitrogen content therein was made to be 0.0001 wt %. Moreover, the atmosphere was made to be argon atmosphere, and reduction was performed under a positive pressure of 1.5 atmospheric pressure.

The obtained hafnium sponge was further subject to electron beam melting to remove volatile elements, gas components and so on. As a result of the foregoing process, it was possible to obtain a high purity hafnium ingot having a purity level of 6N (99.9999 wt %) wherein zirconium is 5 wtppm; iron, chrome and nickel are respectively 0.2 wtppm, 0.01 wtppm and 0.1 wtppm; and oxygen, nitrogen and carbon are respectively 10 wtppm, <10 wtppm and <10 wtppm.

The sputtering target obtained from this ingot was able to maintain high purity, and it was possible to form a high purity hafnium thin film having uniform characteristics on a substrate by performing sputtering with such sputtering target.

By removing zirconium from hafnium chloride aqueous solution of the present invention via solvent extraction, obtaining hafnium sponge via reducing said hafnium chloride, and thereafter performing electron beam melting to this hafnium sponge, zirconium can be efficiently removed, and extremely pure hafnium can be stably manufactured. Thus, such high purity hafnium can be used as a heat-resistant or corrosion-resistant material, or an electronic material or optical material.

The invention claimed is:

1. A method of manufacturing high purity hafnium, comprising the steps of:
    making an aqueous solution of a chloride of hafnium
    removing zirconium from the aqueous solution via organic solvent extraction,
        wherein TBP is used as the organic solvent, and
        performing neutralization treatment to obtain hafnium oxide,
    performing chlorination to the hafnium oxide to obtain hafnium chloride,
    reducing said hafnium chloride to obtain a hafnium sponge, a moisture content in the hafnium chloride before said reducing step and in the atmosphere being 0.1 wt % or less and a nitrogen content therein being 0.1 wt % or less, a reduction atmosphere used in said reducing step being an argon atmosphere, and said reducing step being performed under a positive pressure of 1 atmospheric pressure or greater, and
    subjecting the hafnium sponge to electron beam melting to obtain a hafnium ingot.

2. The method according to claim 1, wherein, during said reducing step, said hafnium chloride is reduced with a metal having a stronger chloridization power than hafnium.

3. The method according to claim 2, wherein the hafnium ingot has a zirconium content of 1 to 1000 wtppm and a purity of 4N to 6N, excluding gas components of carbon, oxygen and nitrogen.

4. The method according to claim 3, wherein the hafnium ingot has 100 wtppm or less of oxygen, 30 wtppm or less of nitrogen and carbon, respectively, and 5 wtppm or less of iron, chromium, and nickel, respectively.

5. A method according to claim 1, wherein the hafnium ingot has a zirconium content of 1 to 1000 wtppm and a purity of 4N to 6N, excluding gas components of carbon, oxygen and nitrogen.

6. A method according to claim 5, wherein the hafnium ingot has 100 wtppm or less of oxygen, 30 wtppm or less of nitrogen and carbon, respectively, and 5 wtppm or less of iron, chromium, and nickel, respectively.

7. A method according to claim 1, wherein the hafnium ingot has 100 wtppm or less of oxygen, 30 wtppm or less of nitrogen and carbon, respectively, and 5 wtppm or less of iron, chromium, and nickel, respectively.

8. A method according to claim 1, wherein said step of making the aqueous solution includes dissolving hafnium tetrachloride ($HfCl_4$) in purified water.

9. A method according to claim 8, wherein said step of removing zirconium from the aqueous solution includes multistage organic solvent extraction.

10. A method according to claim 9, wherein said step of performing neutralization treatment is performed after said solvent extraction to a solution resulting from said solvent extraction and from which zirconium has been removed by said solvent extraction.

11. A method according to claim 1, wherein said step of removing zirconium from the aqueous solution includes multistage organic solvent extraction.

12. A method according to claim 1, wherein said step of performing neutralization treatment is performed after said solvent extraction to a solution resulting from said solvent extraction and from which zirconium has been removed by said solvent extraction.

13. A method of manufacturing high purity hafnium, comprising the steps of:
    dissolving a raw material of hafnium tetrachloride ($HfCl_4$) in purified water to make an aqueous solution;
    removing zirconium from the aqueous solution via multistage organic solvent extraction in which TBP is used as the organic solvent during said solvent extraction;
    after said solvent extraction step, performing neutralization treatment to a solution resulting from said solvent extraction and from which zirconium was removed to obtain hafnium oxide;
    performing chlorination to the hafnium oxide to obtain hafnium chloride;
    reducing said hafnium chloride to obtain a hafnium sponge; and
    subjecting the hafnium sponge to electron beam melting to obtain a hafnium ingot.

14. The method according to claim 13, wherein a moisture content in the hafnium chloride before said reducing step and in the atmosphere is made to be 0.1 wt % or less, and a nitrogen content therein is made to be 0.1 wt % or less.

15. The method according to claim 13, wherein a reduction atmosphere is used in said reducing step and is an argon atmosphere, and wherein said reducing step is performed under a positive pressure of 1 atmospheric pressure or greater.

16. The method according to claim 13, wherein, during said reducing step, said hafnium chloride is reduced with a metal having a stronger chloridization power than hafnium.

17. The method according to claim 13, wherein the hafnium ingot has a zirconium content of 1 to 1000 wtppm and a purity of 4N to 6N, excluding gas components of carbon, oxygen and nitrogen.

18. The method according to claim 13, wherein the hafnium ingot has 100 wtppm or less of oxygen, 30 wtppm or less of nitrogen and carbon, respectively, and 5 wtppm or less of iron, chromium, and nickel, respectively.

* * * * *